INVENTOR.
RICHARD K. SHELBY
BY Robert J. Schaap
ATTORNEY

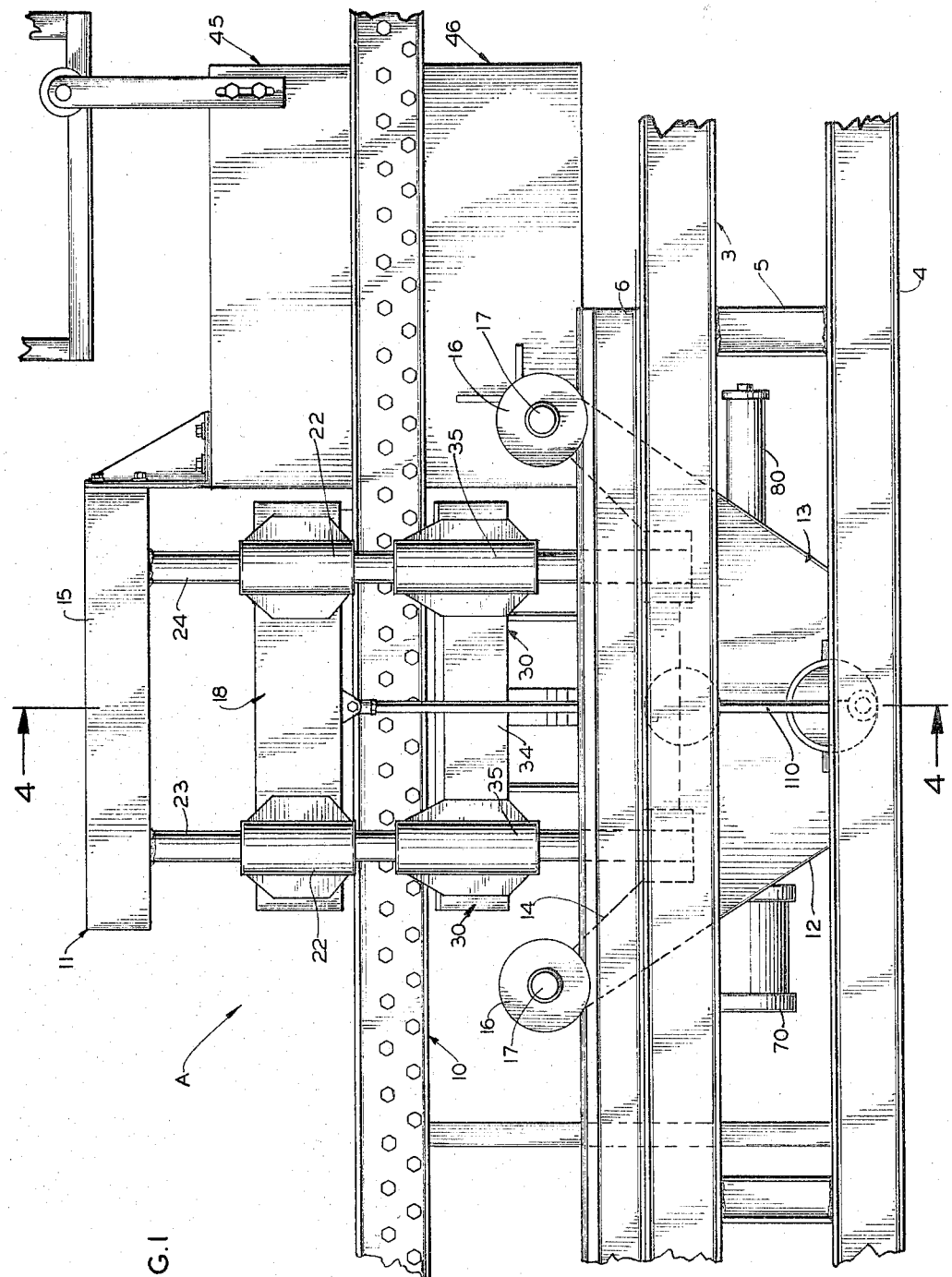

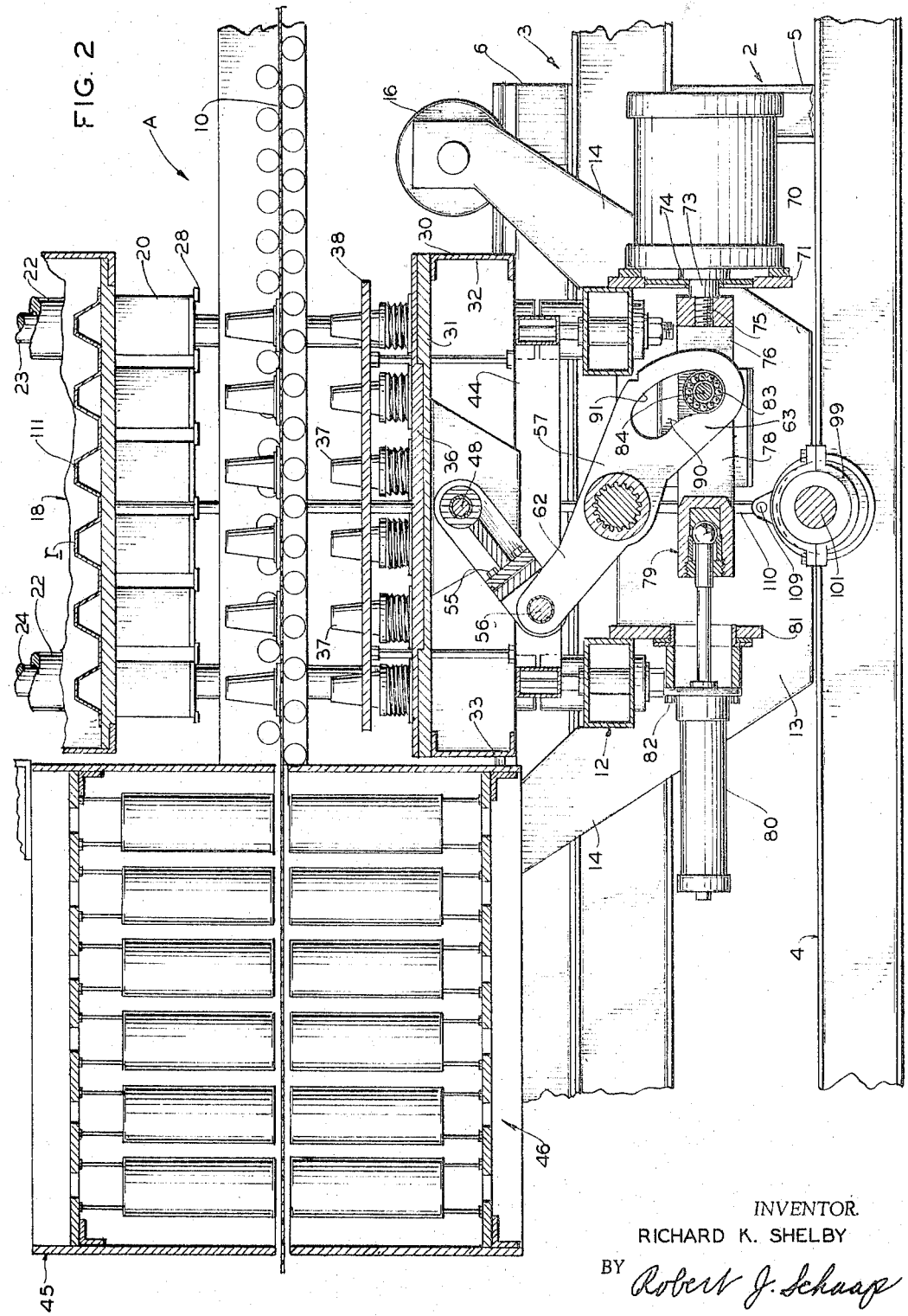

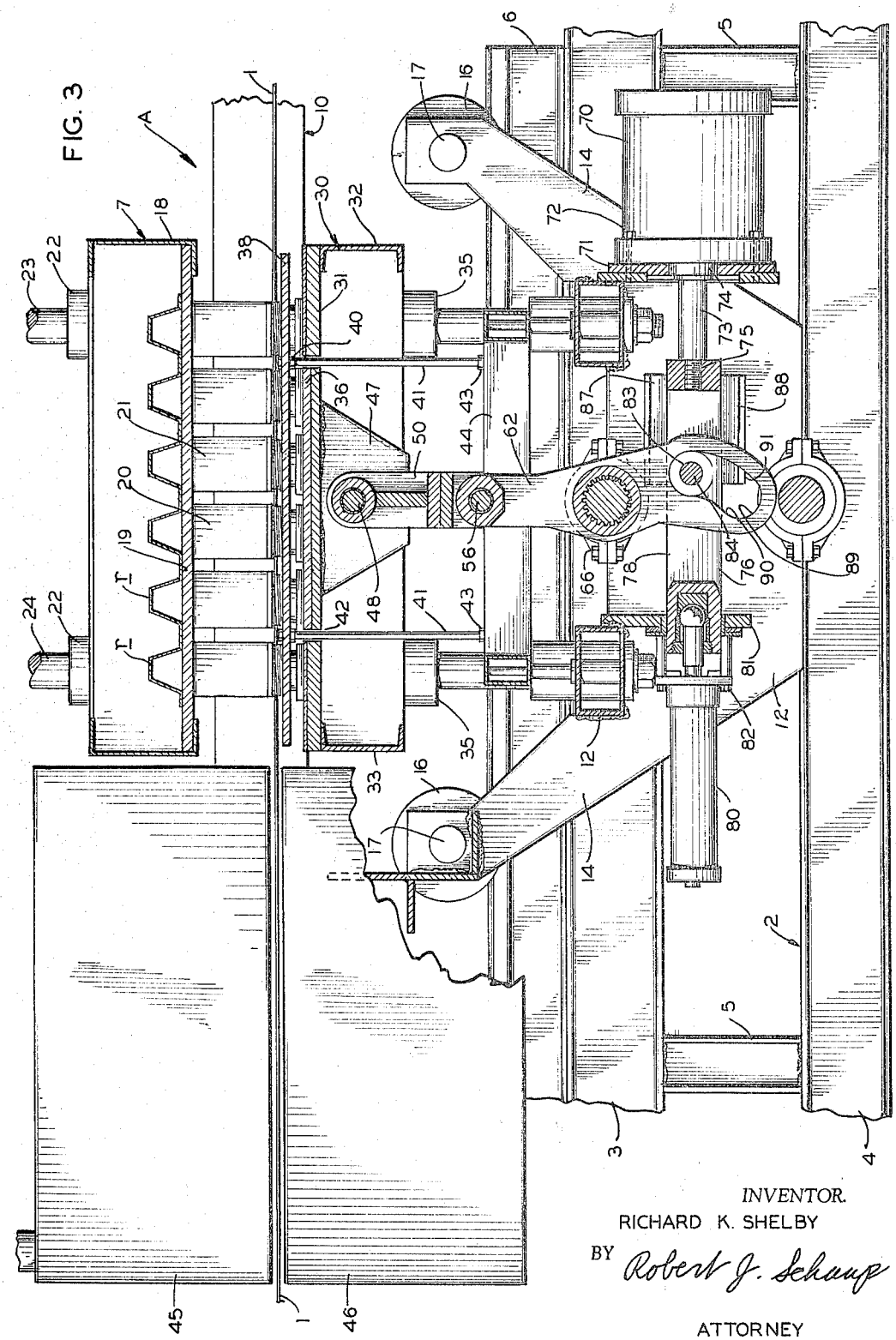

United States Patent Office

3,268,952
Patented August 30, 1966

3,268,952
MOLDING MACHINES
Richard K. Shelby, Downers Grove, Ill., assignor to
Monsanto Company, a corporation of Delaware
Filed Dec. 26, 1963, Ser. No. 333,440
10 Claims. (Cl. 18—19)

This invention relates in general to certain new and useful improvements in molding machines, and more particularly, to an improved positive pressure forming apparatus for molding machines used in the formation of plastics articles.

Today there are a number of commercially available molding machines which are designed to form containers and similar types of thin-walled molded articles from sheets of thermoplastic material. Molding machines of this type generally comprise a device for feeding a sheet of thermoplastic material, either intermittently or continuously between cooperating male and female dies. The male and female dies are normally carried by supporting frame structures and are adapted to shift vertically toward and away from the moving web of thermoplastic material in timed relation thereto.

Recently, there have been some commercially available molding machines of this type which employ differential air pressure assists in the actual formation of the plastic article. These devices usually maintain a differential air pressure upon opposite sides of the sheet when it is formed within the female dies. The side of the sheet which is formed by the male die is generally maintained at atmospheric pressure while the side of the sheet which is formed within the female die is maintained at pressures less than atmospheric pressure to provide vacuum forming of the plastic article. This system has been advantageously employed to obtain more uniform thickness of the finally molded article and to eliminate undesirable flow lines which often present an undesirable appearance to the finally shaped article. There have also been recent attempts to employ positive air pressure assists around the male die to obtain a greater pressure differential. However, all of such attempts, to date, have been ineffective for a number of reasons.

Devices of this latter mentioned type, namely the devices which employ the differential air pressure must necessarily include an effective sealing means between the die frames in order to achieve an adequate pressure differential. In many of these devices, the die frames may shift on a suitable carriage longitudinally with the moving web, as the web is fed continuously into the molding machine. The die frames reciprocatively shift longitudinally for a predetermined distance and are then automatically returned to their initial position. In other devices, the die frames are stationarily mounted with respect to the web and the web is intermittently halted in its operation during the actual molding. All of the devices presently available, whether they employ a continuously moving web, or a web which is intermittently halted, shift the die frames toward and away from the web of thermoplastic material by either pneumatically or hydraulically actuated cylinders. This type of driving means is not generally sufficient to withstand the considerable pressure often employed in molding machines of this type. Consequently, the finally molded articles often lack a uniformity in thickness and hence are not particularly desirable from a commercial standpoint.

It is, therefore, the primary object of the present invention to provide a molding machine which is capable of providing a positive pressure seal between a web of thermoplastic material and cooperating die frames which shift into and out of contact with the thermoplastic material.

It is another object of the present invention to provide a positive pressure forming apparatus for molding machines and similar devices which is capable of maintaining a positive pressure seal between a moving web of thermoplastic material and die frames which shift in a direction perpendicular to the web.

It is a further object of the present invention to provide a positive pressure forming apparatus of the type stated which is capable of being used with molding machines which employ continuously moving webs of moldable material and with molding machines which intermittently halt the movement of the thermoplastic web during molding operations thereof.

It is also an object of the present invention to provide a positive pressure forming apparatus of the type stated having a locking means which is capable of resisting positive pressure forces and thereby maintains effective sealing during molding operations.

It is yet another object of the present invention to provide a molding machine of the type stated which is highly efficient in its operation and is capable of mass producing molded articles of relatively uniform thickness and at a low unit cost.

It is another salient object of the present invention to provide a positive pressure forming apparatus of the type stated which is relatively rigid in its construction and efficient in its operation.

With the above and other objects in view, my invention resides in the novel features of form, construction, arrangement, and combination of parts presently described and pointed out.

In the accompanying drawings (5 sheets):

FIGURE 1 is a side elevational view of the molding machine constructed in accordance with and embodying the present invention;

FIGURE 2 is a longitudinal sectional view of the molding machine of FIGURE 1 with the upper and lower die frames forming part of the machine in the extended portion;

FIGURE 3 is a longitudinal sectional view of the molding machine of FIGURE 1 similar to the sectional view of FIGURE 2, but showing the upper and lower die frames forming a part thereof in the "molding position"

Figure 4A:
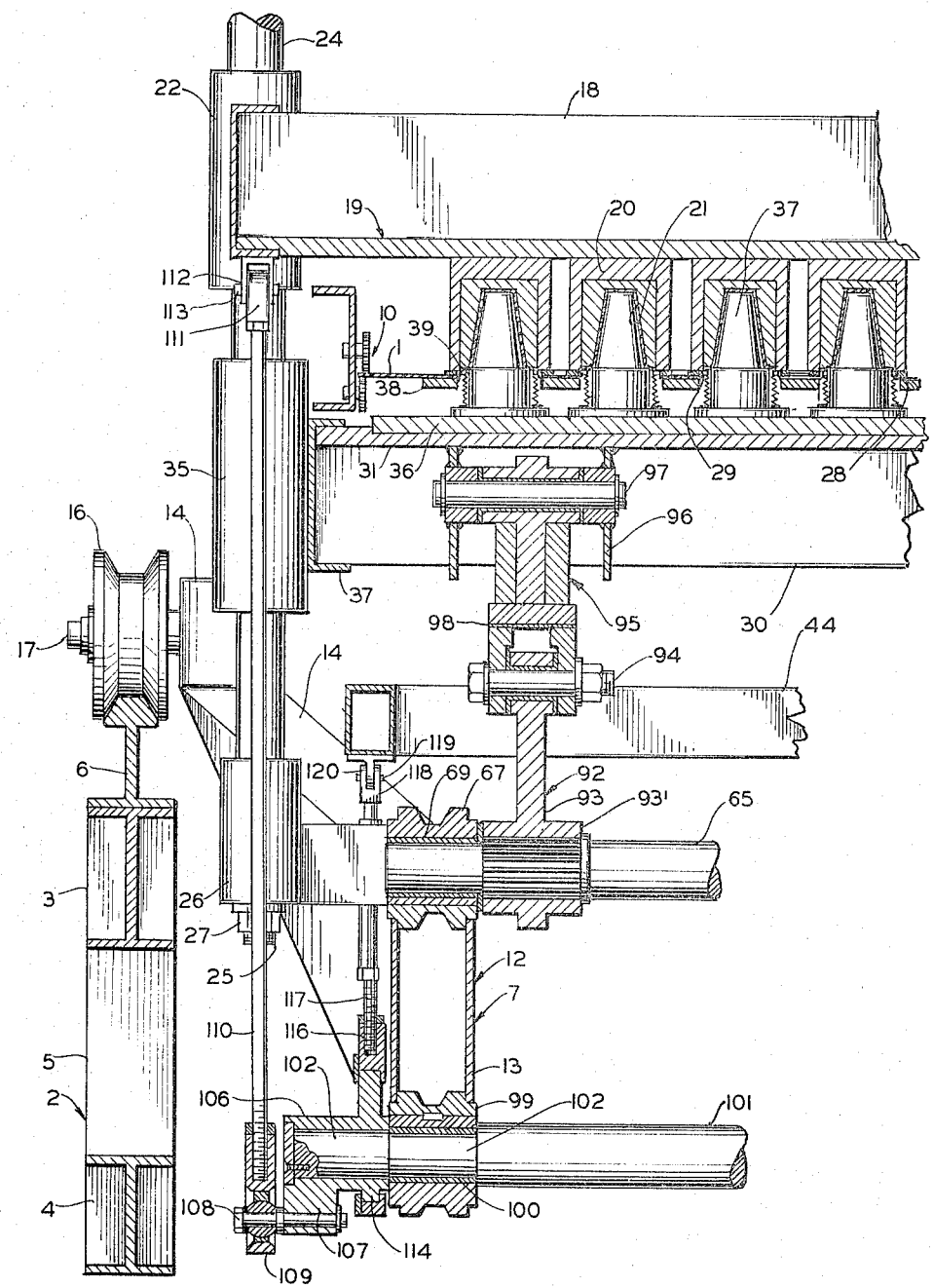
FIGURES 4a and 4b are composite fragmentary vertical sectional views taken along line 4—4 of FIGURE 1.

Generally speaking, the present invention comprises a modified form of the molding machine described in the R. K. Shelby et al. Patent No. 2,967,328 with substantial improvements in the driving means for shifting the lower and upper die frames described in said patent. Furthermore, the molding machine of the present invention employs a positive pressure in the molding operations. The side of the thermoplastic sheet formed within the female die is still maintained under vacuum, while the side of the sheet engaged by the male die will be subjected to a positive air pressure.

The molding machine of the present invention generally comprises an outer supporting structure. Operatively mounted on the supporting structure for reciprocative movement in a substantially horizontal path is a molding carriage. The molding carriage is adapted to reciprocatively shift in the direction of the advancing web of thermoplastic material for a preselected distance and at the same relative rate of movement of the web. After the carriage has been shifted to its forwardmost advanced position in the direction of movement of the web, it is returned to its original position and this forward and rearward shifting constitutes one molding cycle.

Operatively mounted on the longitudinally shifting molding carriage are a pair of upper and lower die frames which are disposed on opposite sides of the advancing web of thermoplastic material. The die frames are suitably provided with male and female die elements which are adapted to engage portions of the thermoplastic web and form the material contained in these portions of the web into molded articles. The upper and lower die frames are shifted into and out of engagement in timed relation to the movement of the web and to the longitudinally shifting movement of the carriage frame. In this manner, the molding operation is continuous and not intermittently interrupted during the actual forming of the thermoplastic material.

The means for shifting the lower die frame in timed relation to the upper die frame and the movable web comprises a powered link which is actuated by a pneumatic cylinder, the latter, in turn, being timed in its operation with respect to the other operations in the molding machine. The powered link is connected to a follower link which is, in turn, pivotally connected to the lower die frame for reciprocatively moving the lower molding die in a vertical direction during the molding operations thereof. The pivotal connections between the two links, and the members to which they are permanently affixed are so located, so that the three pivotal points will lie in a straight line when the lower die frame has been shifted to its uppermost position, thereby locking the lower die frame in this latter position during the molding operations.

The positive pressure forming apparatus of the present invention also includes a drive shaft which is operated in timed relation to the shifting of the lower die frame and the moving thermoplastic web. The drive shaft is operatively connected to the upper die frame for shifting the die frame in cooperatively timed related movement of the lower die frame. Also associated with the drive shaft is a cam system for shifting a positive pressure plate, the latter being interposed between the web of thermoplastic material and the lower die frame.

Referring now in more detail and by reference characters to the drawings which illustrate a preferred embodiment of the present invention, A designates a molding machine which is substantially similar to the molding machine described in the aforementioned Shelby et al. Patent No. 2,967,328 and which is adapted to form relatively thin-walled containers from a continuously moving web 1 of thermoplastic material. The containers which are formed on the continuously moving web 1 are molded in successive groups consisting of six rows of seven cups across with all the cups in this group being formed in one molding cycle of the machine.

The molding machine A generally comprises a main supporting frame 2 which includes upper and lower frame structures 3, 4. The two frame structures 3, 4 are substantially rectangular in horizontal cross section and connected by uprights 5. The remainder of the main supporting frame 2 is more fully described in the aforementioned Shelby et al. patent and is, therefore, neither illustrated nor described in detail herein. The web of thermoplastic material 1 is formed in a suitable extruding apparatus (not shown) which is mounted on the supporting frame 2 and which is also fully described in the Shelby et al. patent.

Welded or otherwise rigidly secured to the main supporting frame 2 are a pair of transversely spaced longitudinally extending carriage supporting rails 6 which support a traveling molding carriage 7 substantially as shown in FIGURE 2. The carriage 7 is shiftable along the rails 6 for reciprocative movement in a horizontal direction and longitudinally with respect to the main supporting frame 2.

The mechanism for driving the carriage 7 on the main supporting frame 2 is not part of the inventive concept herein and is, therefore, neither illustrated nor described in detail. This mechanism is, however, more fully described in the aforementioned Shelby et al patent. The web 1 is advanced continuously through the machine by a web conveying and gripping structure 10 and the carriage 7 is reciprocated in its forward and retracting movements so that it intermittently advances through a predetermined path at the same speed as the movement of the web 1 and during its forward movement, the molding elements carried thereon cooperate and engage the web 1 to form a series of containers on a predetermined area of the web 1. The forming operations are completed when the carriage 7 reaches the end of its path in the direction of the advancing movement of the web 1, that is from right to left, reference being made to FIGURE 1, and the carriage is then returned to its initial starting position with the molding elements free of the web 1 and the cycle of operation is then repeated.

The molding carriage 7, which is in the form of a box-like frame structure comprises a substantially rectangular upper carriage frame 11 and a lower carriage frame 12, the latter including a substantially rectangular base 13 and four obliquely and upwardly extending legs 14. The upper carriage frame 11 includes oppositely facing longitudinally extending side rails 15. Identical lower supporting brackets (not shown) depend at each corner of the legs 14 and carry internally flanged rollers 16 on stub shafts 17 which are rotatably mounted on the supporting brackets for supporting the carriage 7 along the rails 6.

The upper carriage frame 11 carries thereon a sub-frame or so-called die frame 18 of generally rectangular shape and which is spaced below the side rails 15. The vertically movable sub-frame 18 carries an interior frame structure which in turn retains a horizontally disposed support plate 19.

Secured to the underside of the support plate 19 by means of stud bolts (not shown) is a die holding block 20 which carries a series of female die members or cavities 21. The remainder of the structure comprising the die holding block 20 and the cavities 21 is substantially as illustrated and described in the aforementioned Shelby et al. patent and is, therefore, neither illustrated nor described in detail herein. However, it can be seen that the die-frame 18 is provided with a series of transversely extending ribs $r$ which engage the upper surface of the die holding block 20 and the operating structure mounted thereon (not shown). A rib $r$ is provided for each row of cavities 21 and engages that portion of the upper die holding block 20. Since the male die elements, to be hereinafter described, are maintained under pressure, the upper die frame 20 is subjected to a much greater upwardly directed force. The ribs $r$ provide the necessary support to prevent the upper die holding block 20 from vibrating within the die frame 18 during the molding operations. The die frame 18 is integrally provided with guide sleeves 22 at each corner and which are shiftable along forward and rearward vertically extending pairs of guide rods 23, 24 which extend between the upper and lower carriage frames 11, 12 in the manner as shown in FIGURE 1. By reference to FIGURE 4, it can be seen that the guide rods 23, 24 have diametrally reduced threaded lower ends 25, which are threadedly disposed within retaining sleeves 26 and retained by means of locking nuts 27 at their lower ends. The retaining sleeves 26 are welded to the upstanding legs 14 at their upper ends and the guide rods 23, 24 are welded to the underside of the side rails 15 in the manner as shown in FIGURE 1.

Operatively mounted on the underside of the die holding block 20 is a relatively flat horizontally disposed stripper plate 28 which is vertically shiftable with respect to the die holding block 20 and is adapted to strip the movable web 1 from the die holding block 20 after the forming operation. The stripper plate 28 is similarly provided with matching aligned apertures 29 which communicate with the cavities 21. The mechanism for shifting the stripper plate 28 is more fully described in the aforementioned Shelby et al. patent and, therefore, is neither illustrated nor described in detail herein.

A cooperating lower molding frame 30 is mounted in fixed relation on the carriage 7 below the point of travel of the web 1 and is secured between the lower portions of the relatively flat base 13 on a cross beam section (not shown). A plug supporting frame or so-called die frame 31, which is substantially rectangular in horizontal cross section is disposed above the molding frame 30 and is vertically reciprocable relative to the molding frame 30. The plug supporting frame 31 is formed by a pair of transversely extending U-shaped channels 32, 33, which are connected by longitudinally extending side plates 34. Welded or otherwise rigidly secured to each of the side plates 34 near the forward and rearward transverse ends thereof are enlarged guide sleeves 35 which are disposed about each of the four upstanding guide rods 23, 24 for guiding the movement of the plug support frame 31 as it shifts vertically toward and away from the web 1. A horizontal support plate 36 is secured to the upper surface of the plug supporting frame 31 and bolted or otherwise rigidly secured to the upper surface of the support plate 36 are a series of upstanding plug assists or male dies 37, the exterior shape of which generally conforms to the interior shape of the finally molded articles. The male plug assists are maintained under a positive air pressure during the molding operation. The male plug assists 27 and the manifold structure for delivering air to the plug assists 37 is more fully described in my copending application Serial No. 534,442, filed March 15, 1966.

A web clamping support plate 38 is interposed between the support plate 36 and the web 1 and is provided with rows of aligned apertures 39 for accommodating the plug assists 37 as the plug supporting frame 31 is shifted upwardly toward the web 1. The plate 38 is provided with four sockets 40 which are secured to the threaded upper ends of four spaced guide rods 41 which extend through guide apertures 42 formed in the support plate 36. The guide rods 41 are provided with threaded lower ends which are threadedly secured to sockets 43 which are in turn secured to the upper surface of a vertically shiftable horizontally disposed positive pressure frame 44 hereinafter described in detail. The web clamping support plate 38 supports a series of web clamping rings (not shown) and thereby forms a clamping frame which is adapted to move upwardly to bring the clamping rings into engagement with the bottom face of the web 1. A positive pressure bellows of the type described in my copending application Serial No. 534,325, filed March 15, 1966, is disposed around each of the plug assists 37 and is sized to extend through the aperture 39 and engage the underside of the web 1 during molding operations. Inasmuch as this apparatus is more fully illustrated and described in my copending application Serial No. 534,442, filed March 15, 1966, the operation thereof is neither illustrated nor described in detail herein.

The upper and lower die holding frames 18, 30 will shift with respect to each other and in timed relation to the reciprocative movement of the carriage 7 and the movable web 1. As this occurs, various selected areas of the web 1, which have been preheated by suitable banks of heaters 45, 46 described in my copending application Serial No. 333,313, filed December 26, 1963, will be forced into the cavities 21 by the male plug assists 37 and the material will form a container which substantially conforms to the size and shape of the cavities 21.

Welded or otherwise rigidly secured to the underside of the support plate 36 adjacent one longitudinal margin thereof is a pair of depending clevis-forming plates 47. Pivotally mounted on the clevis-forming plates 47 by means of a pin 48 is the upper end 49 of a follower link 50. The pin 48 rotates in a bushing ring 51, which is held by a pair of retaining sleeves 52 welded to the clevis forming plate 47, the sleeves 52 in turn being retained by a pair of lock rings 53 on the opposite ends of the pin 48. The follower link 50 is split somewhat centrally of its length for accommodating a series of removable shims 54 and which are retained by means of bolts 55 in the manner substantially as shown in FIGURES 2 and 4a. By means of the above outlined construction, it is possible to marginally vary the overall length of the follower link 50 for reasons which are hereinafter set forth.

Pivotally secured to the free end of the follower link 50 by means of a free floating pivot pin 56 is a driving link 57. The pin 56 is retained in clevis 58 formed along the lower end of the follower link 50 by means of a lock nut 59. The clevis 58 is provided with a groove 60 which accommodates an enlarged upper end 61 of the link 57 in the manner as shown in FIGURES 2 and 4a. By reference to FIGURES 2 and 3, it can be seen that the driving link 57 has a relatively straight portion 62 and an arcuate portion 63. Somewhat centrally of its length, the driving link 57 is provided with an enlarged boss 64 for mounting the link 57 on an oscillating splined shaft 65. The shaft 65 is journaled within pillow blocks 66, 67 which contain bearings 68, 69 and are welded to the lower carriage frame 12 in the manner as shown in FIGURE 4.

The driving link 57 is powered by a pneumatic cylinder 70 which is secured to a support plate 71 by means of bolts 72, the support plate 71 being welded or otherwise rigidly secured to the lower carriage frame 12 and which is operated in timed relation to the shifting movement of the carriage 7. The pneumatic cylinder 70 includes a movable piston rod 73 which extends through a guide ring 74 mounted on the forward end of the cylinder 70. The piston rod 73 is provided with a diametrally reduced threaded portion 75 which is secured to the rearward end of a somewhat rectangular driving rod 76, the latter consisting of a pair of spaced parallel rectangular bars 77 which are separated by a rectangular slot 78, for reasons which will presently more fully appear. At its forward end, the driving rod 76 is provided with a universal joint 79 which is connected to the piston rod (not shown) of a conventional hydraulic damper or so-called cushioning cylinder 80, which is secured to a mounting plate 81 by means of bolts 82, the mounting plate 81, in turn, being secured to the lower carriage frame 12. By means of the above outlined construction, it can be seen that the hydraulic damper 80 provides a cushioning action and thereby maintains a substantially uniform rate of speed from the pneumatic cylinder 70.

Disposed within the slot 78 is a driving roller 83 which is mounted on a pintle 84, the latter also retaining outer guide rollers 85, 86 which are disposed upon opposite sides of the two bars 77 in the manner as shown in FIGURE 4. The rollers 85, 86 are adapted to ride within guides 87, 88 for maintaining the driving rod 76 in a substantially horizontal plane.

The driving roller 83 is moveable within an arcuate slot 89 formed within the arcuate portion 63 of the driving link 57, and is adapted to bear against arcuate guide surfaces 90, 91 formed by the arcuate slot 89. By reference to FIGURE 2, it can be seen that when the piston rod 73 and the drive rod 76 carried therewith are extended, the driving roller 83 will bear against the guide surface 90 of the slot 89 and thereby cause the driving link 57 to rotate in a clockwise direction and thereby rotate the splined shaft 65. As the driving link 57 and shaft 65 rotate in a clockwise direction, the pivot pin 56 maintaining the pivotal connection between the driving link 57 and the follower link 50 will shift to the right and thereby maintain an upwardly directed force on the lower die frame 31 urging the same in an upward direction. Continued extension of the piston rod 73 will continue to shift the driving rod 76 causing the roller 83 to continue to bear against the guide surface 90 until it reaches the uppermost position of the arcuate slot 89 substantially as shown in FIGURE 3. As this occurs, the pin 56 will shift to the right and the pin 48, the pin 56 and the shaft 65 will all lie within the same vertical plane. At this point, the plug supporting frame 31 will have been shifted to its uppermost position. It can thus be seen that if the pin 48, the pin 56, and the shaft 65 lie within the same vertical plane, they, in effect, form three pivot points which maintain an effective locking means that will not yield under the pressure from the upper die frame 18. When the piston rod 73 is retracted, the drive rod 76 will cause the roller 83 to bear against the guide surface 91 and cause the driving link 57 and the shaft 65 to pivot in a counter clockwise direction. Thus, it can be seen that the shaft 65 rotates through an arc of approximately 90°.

Since the lower plug support frame 31 and the elements carried thereon are relatively wide in the transverse dimension and exert a considerable downward force due to their weight, a compensating or so-called balancing link system 92 is provided along the opposite transverse end of the shaft 65 with respect to the driving link 57. The balancing link system 92 comprises a balancing link 93 having an enlarged boss 93′ which is concentrically disposed about and keyed to the splined shaft 65, so that the link 93 is pivotal with the shaft 65. Pivotally secured to the upper end of the balancing link 93 by means of a pin 94 is a follower link 95, which is substantially identical to the previously described follower link 50 and is also pivotally secured to a pair of clevis forming plates 96 formed on the underside of the plate 36 by means of a pin 97. The pivotal connection between the balancing link 93 and the follower link 95 is substantially identical to the pivotal connection between the driving link 57 and the follower link 50. However, the follower link 95 similarly can be adjusted by means of shims 98. Thus as the shaft 65 rotates through the action of the driving link 57, the balancing link 93 will similarly shift and maintain the driving action on the opposite transverse end of the lower die frame 31.

Rigidly secured to the base 13 forming part of the lower carriage frame 12 are a pair of transversely aligned pillow blocks 99 which retain bearings 100. A transversely extending drive shaft 101 is provided with diametrically reduced transverse ends 102 which extend through and are journaled within the pillow blocks 99 in the manner as shown in FIGURE 4. A pinion gear 103 having an integrally formed enlarged boss 104 is keyed to and rotatable with the shaft 101. The pinion gear 103 meshes with a rack bar 105 which is operatively connected to the main drive mechanism (not shown) and reciprocates in timed relation thereto for oscillating the drive shaft 101 about its central axis.

The diametrally reduced ends 102 extend through the pillow blocks 99 and mounted on each of the transverse ends thereof are cylindrical sleeves 106 having integrally formed radially extending crank arms 107. Pivotally secured to the outer ends of the crank arms 107 through pivot pins 108 are rod couplings 109 which are provided with sockets for accommodating the lower threaded end of lifting rods 110. At their upper ends, the rods 110 are provided with fittings 111 and are pivotally secured to clevis-forming members 112 through pivot pins 113, the clevis-forming members 112 being rigidly secured to the upper die frame 18, all as best can be seen in FIGURES 1 and 4. Thus, it can be seen that as the drive shaft 101 rotates through the action of the pinion 103 and rack bar 105, the crank arms 107 will rotate through a 180° arc and thereby raise the lifting rods 110 and carry therewith the upper die frame 18. When the drive shaft 101 is rotated 180° in the opposite direction, the crank arms 107 will shift to their lowermost position as shown in FIGURE 4 and through the action of the lift rods 110 will lower the upper die frame 18 to its lowermost position.

Figure 4B:
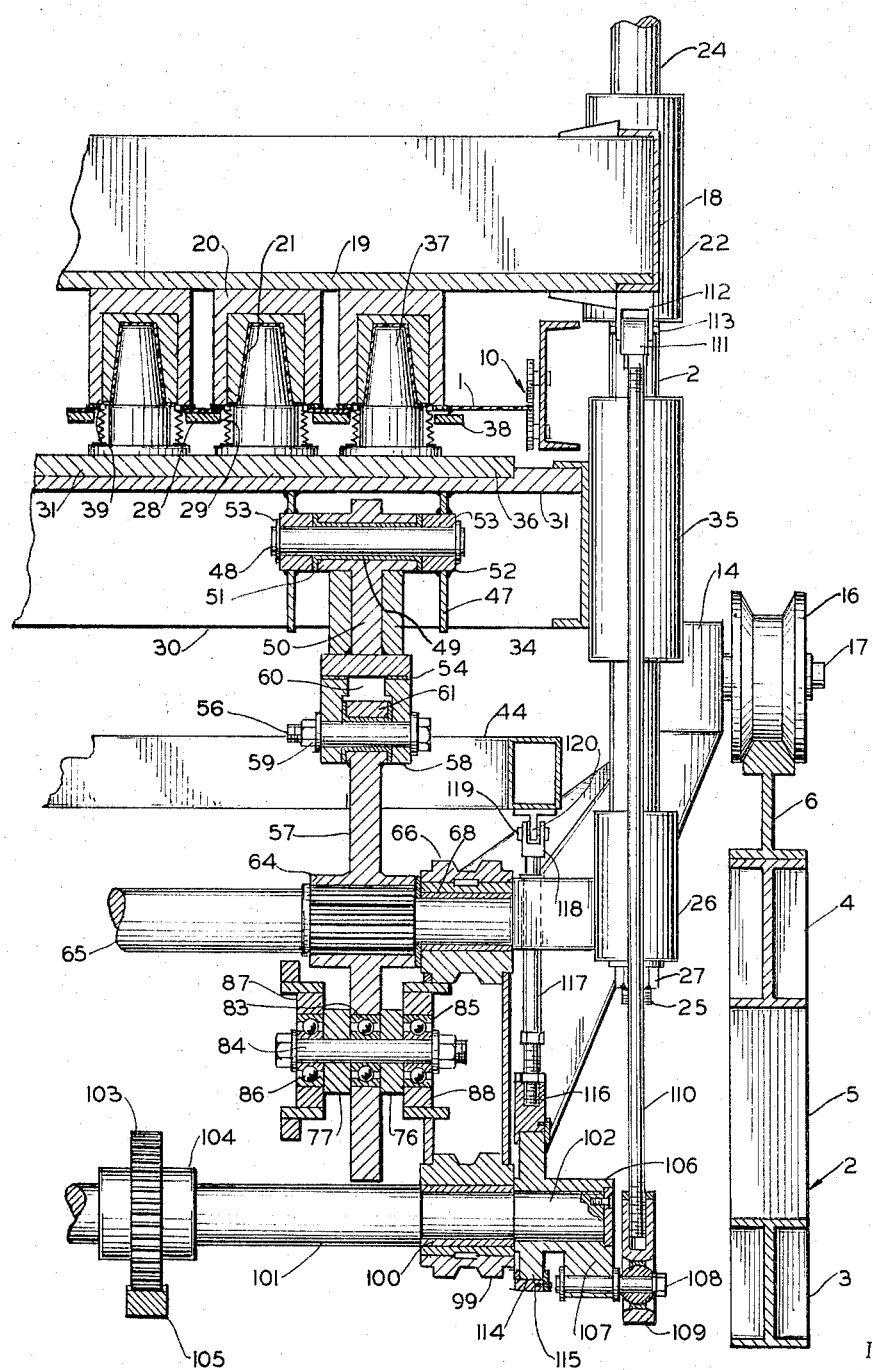

The cylindrical sleeves 106 are also integrally formed with eccentrically located cams 114 having camming surfaces 115. The cams are circular but eccentric location thereof produces high portions which are diametrally opposite the crank arms 107. Thus, when the crank arms 107 are in their lowermost positions, the high portions of the camming surfaces 115 will be in their uppermost positions, as presently shown in FIGURES 4a and 4b. Concentrically disposed about each of the cams 114 are cam follower sleeves 116 which do not rotate with the cams 114 during their 180° movement but shift in a vertical direction as the cams 114 rotate. Each of the cam follower sleeves 116 is provided at its upper end with sockets for accommodating the lower threaded ends of crank rods 117. Secured to the upper ends of the crank rods 117 are yokes 118 for pivotal securement through pins 119 to flanges 120 formed on the underside of the positive pressure forming frame 44. Thus, it can be seen that when the shaft 101 is rotated in the counter clockwise direction, reference being made to FIGURE 1, the sleeves 106 which are carried therewith will rotate the crank arms 107 to their uppermost position and through the action of the lift rods 110 will raise the upper die frame 18 to its uppermost position. Contemporaneously with the lifting of the upper die frame 18, the camming surfaces 115 will shift to their lowermost position thereby shifting the cam follower sleeves 116 downwardly and through the action of the rods 117 will lower the positive pressure frame 44. Since the rods 41 are connected to the web clamping support plate 38, this plate will also be shifted to its lowermost position. Similarly, when the shaft 101 is rotated in the clockwise direction, the crank arms 107 will be shifted to their lowermost position as shown in FIGURE 4, and thereby lower the upper die frame 18 through the action of the lift rods 110. Simultaneously therewith, the camming surfaces 115 will, through the action of the rods 117, shift the frame 44 and the plate 38 to their uppermost positions thereby maintaining a positive pressure seal against the underside of the web 1.

In use, the web 1 is continually advancing through the molding machine A by the web moving and gripping structure 10. The carriage 7 is reciprocated in its forward and retracting movements by an automatic system (not shown) so that it intermittently advances through a predetermined path at the same speed as the web 1. The cycle is started when the carriage 7, which is at its rearwardmost position, reference being made to FIGURE 1, moves simultaneously with the web 1 in a forwardly direction. The cycle is, of course, completed after the carriage 7 has reached its forwardmost position and is then returned to its initial starting position.

The pneumatic cylinder 70 is timed in relation to the mechanism which drives the carriage 7 and will extend the piston rod 73 in this timed relation so that the upper and lower die frames 18, 31 will cooperate to engage the web of thermoplastic material 1. As the piston rod 73 extends, the drive roller 83 carried by the drive rod 76 will bear against the guide surface 90 and thereby rotate the shaft 65 in a clockwise direction, reference being made to FIGURE 2. Continued extension of the piston rod 73 will cause the drive roller 83 to move to its uppermost position in the arcuate slot 89 and thereby cause the shaft 65 to rotate until the drive link 57 and follower link 50 have assumed the position as shown in FIGURE 3. At this point, it can be seen that the pin 48, the pin 56 and the shaft 65 form three pivot points which lie within the same vertical plane and thereby form an effective lock for holding the lower die frame 31 in its uppermost position.

Simultaneously with the operation of the pneumatic cylinder 70, the rack bar 105 will rotate the pinion gear 103 causing the drive shaft to rotate through a 180° arc. As this occurs, the crank arms 107 which are in their uppermost position, when the upper die frame 18 is in its uppermost position, will be shifted to their lowermost positions. The lift rods 110 will thereby, lower the upper die frame 18 to its lowermost position as shown in FIGURES 3 and 4.

Simultaneously with the shifting of the lower die frames 18, 31 respectively, the camming surfaces 115 will be shifted to their uppermost position as shown in FIGURE 4. The cam follower sleeves 116 will thereby lift the rods 117 and thus shift the positive pressure forming frame 44 to its uppermost position as shown in FIGURE 4. The guide rods 41, which extend through the frame 31 will lift the plate 38 to its uppermost position where it engages the underside of the web 1 and forms an effective positive pressure seal. In this connection, it should be noted that both the upper and lower die frames 18, 31 each shift through a total distance of 6" when they are lowered and raised respectively. The positive pressure plate 38 will shift through a total of 2" when it is raised to the position as shown in FIGURES 3 and 4, so as to hold a cup-making section of the web in fixed relation to each set of forming members during the forming operation. The plug assists 37 will engage the web of thermoplastic material 1 and force the same into the female die cavities 21 to form containers substantially as shown in FIGURES 2 and 3.

After the carriage 7 has reached its forwardmost position of travel, it will immediately shift back to its initial position. As it begins to shift to its initial position, the pneumatic cyclinder 70 will retract the piston rod 73 and carry therewith the drive rod 76. As this occurs, the drive roller 83 will bear against the guide surface 91 of the slot 89 and cause the drive link 57 to proceed in a counter clockwise direction, reference being made to FIGURE 2. As this occurs, the pivot pin 56 will shift to the left until it reaches the position as shown in FIGURE 2. Through the action of the driving link and follower link 50, the lower die frame 31 will be shifted to its lowermost position as shown in FIGURE 2.

Simultaneous with the shifting of the lower die frame 31, the rack bar 105 will rotate the pinion gear 103 in a clockwise direction moving the crank arms 107 to their uppermost position. This will, in turn, shift the upper die frame 18 to its uppermost position through the action of the lift rods 110. The rotation of the shaft 101 will also cause the camming surfaces 115 to be shifted to their lowermost position and the cam follower sleeves will shift the positive pressure frame 44 downwardly to its lowermost position as shown in FIGURE 2. The rods 41 will then move the plate 38 to its lowermost position as shown in FIGURE 2.

By means of the above outlined construction, it can be seen that both the upper and lower die frames 18, 31 are shifted by means of mechanical structure rather than pneumatic structure and therefore when they are held in the locked position, they will not yield against pneumatic cyclinders. Moreover, the link system provides an effective locking means which will not yield even against extreme pressure from the upper die frame 18.

It should be understood that changes and modifications can be made in the form, construction, arrangement and combination of parts presently described and pointed out without departing from the nature and principle of my invention.

Having thus described my invention, what I desire to claim and secure by Letters Patent is:

1. A molding machine comprising a supporting frame, a pair of oppositely disposed cooperating upper and lower die frames operatively mounted on said molding machine and being adapted to shift toward and away from each other, means for passing a web of moldable material between said die frames, means operatively mounted on said molding machine for reciprocatively shifting said upper die frame toward and away from the lower die frame, a first link pivotally connected to said lower die frame, a second link pivotally connected to said first link, and being pivotally mounted on said supporting frame, pneumatic means operatively mounted on said supporting frame, camming means operable by said pneumatic means and providing an operative interconnection between said pneumatic means and said second link, whereby actuation of said pneumatic means will cause said camming means to create a pivotal movement of said second link for shifting said first and second links thereby raising and lowering said lower die frame in timed relation to the movement of said web.

2. A molding machine comprising a supporting frame, a pair of oppositely disposed cooperating upper and lower die frames operatively mounted on said molding machine and being adapted to shift toward and away from each other, means for passing a web of moldable material between said die frames, means operatively mounted on said molding machine for reciprocatively shifting said upper die frame toward and away from the lower die frame, a first link pivotally connected to said lower die frame and establishing a first pivot point, a second link pivotally connected to said first link and establishing a second pivot point, said second link being pivotally mounted on said supporting frame and establishing a third pivot point, each of said pivot points lying in a straight line when said lower die frame is shifted to its uppermost position, pneumatic means operatively mounted on said supporting frame, and movable means connecting said pneumatic means to said second link thereby establishing a driving contact point, the distance of which is variable with respect to said third pivot point as said second link is pivoted about said third pivot point, whereby actuation of said pneumatic means will cause the driving contact point to move with respect to the third pivot point creating a pivotal movement of said second link for shifting said first and second links and thereby raising and lowering said lower die frame in timed relation to the movement of said web.

3. A molding machine comprising a supporting frame, a pair of oppositely disposed cooperating upper and lower die frames operatively mounted on said molding machine and being adapted to shift toward and away from each other, means for passing a web of moldable material between said die frames, means operatively mounted on said molding machine for reciprocatively shifting said upper die frame toward and away from the lower die frame, a first link pivotally connected to said lower die frame and having an internal slot, a second link pivotally connected to said first link at one end and being pivotally mounted on said supporting frame at its other end, pneumatic means operatively mounted on said supporting frame, and roller means operatively disposed within said internal slot and being connected to said pneumatic means, whereby actuation of said pneumatic means will cause said roller means to move within said internal slot and shift said links thereby raising and lowering said lower die frame in timed relation to the movement of said web.

4. A molding machine comprising a supporting frame, a pair of oppositely disposed cooperating upper and lower die frames operatively mounted on said molding machine and being adapted to shift toward and away from each other, means for passing a web of moldable material between said die frames, means operatively mounted on said molding machine for reciprocatively shifting said upper die frame toward and away from the lower die frame, a first link pivotally connected to said lower die frame and establishing a first pivot point, said first link having an internal slot, a second link pivotally connected to said first link and establishing a second pivot point, said second link being pivotally mounted on said supporting frame and establishing a third pivot point, each of said pivot points lying in a straight line when said lower die frame is shifted to its uppermost position, pneumatic means operatively mounted on said supporting frame, and roller means operatively disposed within said internal slot and being connected to said pneumatic means, whereby actuation of said pneumatic means will cause said roller means to move within said internal slot and shift said links thereby raising and lowering said lower die frame in timed relation to the movement of said web.

5. A positive pressure forming device for use with an apparatus for providing plastic items wherein the apparatus has a supporting frame and oppositely disposed cooperating die frames and at least one of said die frames shifts in timed relation to the movement of a movable moldable web; said positive pressure forming device comprising a first link pivotally connected to said shiftable die frame and having an internal slot, a second link pivotally connected to said first link at one end and to said supporting frame at its other end, pneumatic means operatively mounted on said supporting frame, and roller means operatively disposed within said internal slot and being connected to said pneumatic means, whereby actuation of said pneumatic means will cause said roller means to move within said internal slot and shift said links thereby raising and lowering said shiftable die frame toward and away from said web in timed relation to the movement of said web.

6. A positive pressure forming device for use with an apparatus for producing plastic items wherein the apparatus has a supporting frame and oppositely disposed cooperating die frames and at least one of said die frames shifts in timed relation to the movement of a movable moldable web; said positive pressure forming device comprising a first link pivotally connected to said shiftable die frame, and establishing a first pivot point, said first link having an internal slot, a second link pivotally connected to said first link, and establishing a second pivot point, said second link being pivotally mounted on said supporting frame and establishing a third pivot point, each of said pivot point lying in a straight line when said shiftable die frame is shifted to its extendedmost position, pneumatic means operatively mounted on said supportting frame, and roller means operatively disposed within said internal slot and being connected to said pneumatic means, whereby actuation of said pneumatic means will cause said roller means to move within said internal slot and shift said links and thereby raising and lowering said die frame toward away from said web in timed relation to the movement of said web.

7. A molding machine comprising a supporting frame, a pair of oppositely disposed cooperating upper and lower die frames operatively mounted on said molding machine and being adapted to shift toward and away from each other, means for passing a web of moldable material between said die frames, means operatively mounted on said molding machine for reciprocatively shifting said upper die frame toward and away from the lower die frame, a first driving link pivotally connected to said lower die frame and establishing a first pivot point, a second driving link pivotally connected to said first driving link and establishing a second pivot point, said second link being pivotally mounted on said supporting frame and establishing a third pivot point, each of said pivot points lying in a straight line when said lower die frame is shifted to its uppermost position, a first balancing link pivotally connected to said lower die frame establishing a fourth pivot point in horizontal alignment with said first pivot point, a second balancing link pivotally connected to said first balancing link and establishing a fifth pivot point in horizontal alignment with said second pivot point, said second balancing link being pivotally mounted on said supporting frame and establishing a sixth pivot point in horizontal alignment with said third pivot point, means connecting said second driving link and said second balancing link at the third and sixth pivot points respectively so that said first driving and first balancing links and said second driving and second balancing links have corresponding movements, and pneumatic means operatively mounted on said supporting frame and being connected to said second driving link for shifting said driving links which in turn shifts said balancing links and thereby raise and lower said lower die frame in timed relation to the movement of said web.

8. A molding machine comprising a supporting frame, a pair of oppositely disposed cooperating upper and lower die frames operatively mounted on said molding machine and being adapted to shift toward and away from each other, means for passing a continuously moving web of moldable material between said die frames along a substantially horizontal path, a web clamping frame operatively mounted on said supporting frame and being horizontally disposed between said web and said lower die frame, means operatively mounted on said molding machine for reciprocatively shifting said lower die frame toward and away from said web in timed relation to the movement of the web, an oscillating shaft operatively mounted on said supporting frame, powered means for oscillating said shaft about its central longitudinal axis in timed relation to the movement of said web and lower die frame, camming means operatively mounted on said shaft and rotating therewith, rod means connecting said upper die frame and camming means for shifting the upper die frame in cooperative time related movement to the lower die frame, and means operatively associated with said oscillating shaft for shifting said clamping frame into and out of clamping position with said web in timed relation to the movement of the upper and lower die frames.

9. A molding machine comprising a supporting frame, a pair of oppositely disposed cooperating upper and lower die frames operatively mounted on said molding machine and being adapted to shift toward and away from each other, means for passing a continuously moving web of moldable material between said die frames along a substantially horizontal path, a web clamping frame operatively mounted on said supporting frame and being horizontally disposed between said web and said lower die frame, means operatively mounted on said molding machine for reciprocatively shifting said lower die frame toward and away from said web in timed relation to the movement of the web, an oscillating shaft operatively mounted on said supporting frame, powered means for oscillating said shaft about its central longitudinal axis in timed relation to the movement of said web and lower die frame, retaining means having a crank arm operatively mounted on said oscillating shaft and rotating therewith, first rod means pivotally connected to said upper die frame and to the crank arm for shifting the upper die frame in cooperative time related movement to the lower die frame, and camming means operatively associated with said retaining means and oscillating shaft and having an eccentric portion which is diametrally opposed to said crank arm, second rod means connecting said camming means and clamping frame for shifting said clamping frame into and out of clamping position with said web in timed relation to the movement of the upper and lower die frames.

10. A molding machine comprising a supporting frame, means on said frame for continuously advancing a web of moldable material along a substantially horizontal path through said machine, a molding carriage mounted on said supporting frame for reciprocative movement in a horizontal path, means for intermittently moving the molding carriage in the direction of the advancing web of moldable material for a predetermined distance at the same speed of movement of the web and for returning the carriage to its original position, a pair of oppositely disposed cooperating upper and lower die frames operatively mounted on said carriage and being adapted for reciprocative movement toward and away from said web, a web clamping frame operatively mounted on said molding carriage and being horizontally disposed between said web and said lower die frame, an oscillating shaft operatively mounted on said molding carriage, powered means for oscillating said shaft about its central longitudinal axis in timed relation to the movement of said web and lower die frame, retaining means having a crank arm operatively mounted on said oscillating shaft and being rotatable therewith, first rod means pivotally connected to said upper die frame and to the crank arm for shifting the upper die frame in cooperative time related movement to the lower die frame, camming means operatively associated with said retaining means and oscillating shaft and having an eccentric portion which is diametrically opposed to said crank arm, second rod means connecting said camming means and clamping frame for shifting said clamping frame into and out of clamping position with said web in timed relation to the movement of the upper and lower die frames, a first driving link pivotally connected to said lower die frame and establishing a first pivot point, said first link having an internal slot, a second driving link pivotally connected to said first link and establishing a second pivot point, said second link being pivotally mounted on said molding carriage and establishing a third pivot point, each of said pivot points lying in a straight vertical line when said lower die frame is shifted to its uppermost position, a first balancing link pivotally connected to said lower die frame establishing a fourth pivot point in horizontal alignment with said first pivot point, a second balancing link pivotally connected to said first balancing link and establishing a fifth pivot point in horizontal alignment with said second pivot point, said second balancing link being pivotally mounted on said molding carriage and establishing a sixth pivot point in horizontal alignment with said third pivot point, means connecting said second balancing link and said second driving link at the third and sixth pivot points respectively so that said first driving link and first balancing link and second driving link and second balancing link have corresponding movements, pneumatic means operatively mounted on said molding carriage, and roller means operatively disposed within said internal slot and being connected to said pneumatic means, whereby actuation of said pneumatic means will cause said roller means to move within said internal slot and shift said links thereby raising and lowering said lower die frame in timed relation to the movement of said web.

References Cited by the Examiner
UNITED STATES PATENTS

| | | | |
|---|---|---|---|
| Re. 25,484 | 11/1963 | Koster | 18—19 |
| 1,327,710 | 1/1920 | Helmstreet. | |
| 1,904,268 | 4/1933 | Bronson | 18—19 XR |
| 2,389,561 | 11/1945 | Stokes | 18—16 |
| 2,882,556 | 4/1959 | Hall | 18—16.5 |
| 2,967,328 | 1/1961 | Shelby et al. | 18—19 |
| 3,000,429 | 9/1961 | Warnken | 18—16 XR |
| 3,007,201 | 11/1961 | Brummer | 18—19 XR |
| 3,014,239 | 12/1961 | Weber | 18—19 |
| 3,058,154 | 10/1962 | Howard et al. | 18—19 XR |
| 3,105,270 | 10/1963 | Fibish | 18—19 |

WILLIAM J. STEPHENSON, *Primary Examiner.*

MICHAEL V. BRINDISI, *Examiner.*